United States Patent [19]

Wise

[11] 4,213,696

[45] Jul. 22, 1980

[54] SCAN MECHANISM FOR A MICROFILM READER/PRINTER

[75] Inventor: David S. Wise, Solon, Ohio

[73] Assignee: Western Reserve Electronics, Inc., Twinsburg, Ohio

[21] Appl. No.: 35,531

[22] Filed: May 4, 1979

[51] Int. Cl.² .............. G03G 15/30; G03B 27/32; G03B 27/70
[52] U.S. Cl. .............................. 355/45; 355/77; 355/5; 355/47; 355/66
[58] Field of Search .............. 355/8, 11, 44, 45, 47, 355/66, 77, 5, 49, 65

[56] References Cited

U.S. PATENT DOCUMENTS

| | | | |
|---|---|---|---|
| 3,663,101 | 5/1972 | Vor Grabe | 355/45 |
| 3,740,137 | 6/1973 | Sato | 355/66 |
| 3,841,753 | 10/1974 | Ogawa | 355/8 |
| 3,871,766 | 3/1975 | Inoue | 355/66 |
| 3,988,064 | 10/1976 | Sone et al. | 355/45 X |
| 4,023,897 | 5/1977 | Clark | 355/8 |

*Primary Examiner*—L. T. Hix
*Assistant Examiner*—W. J. Brady
*Attorney, Agent, or Firm*—Shoemaker and Mattare, Ltd.

[57] ABSTRACT

A scan mechanism for a microfilm reader/printer couples the stationary image of a microfilm reader to a rotating drum of a printer and maintains a conjugate length of a slit image path fixed and also maintains the angle of the slit image path normal to the axis of the stationary image path across the entire format.

9 Claims, 11 Drawing Figures

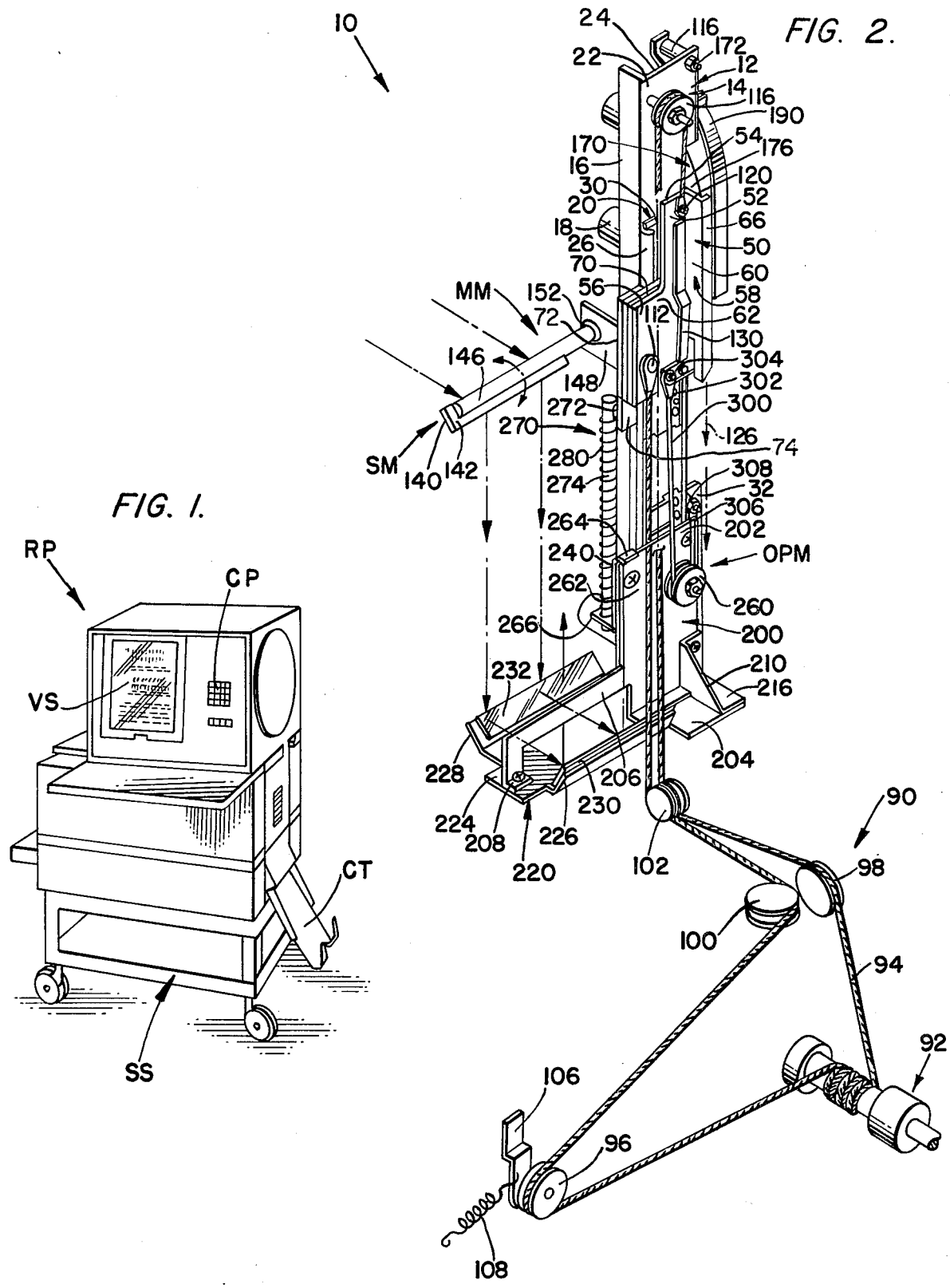

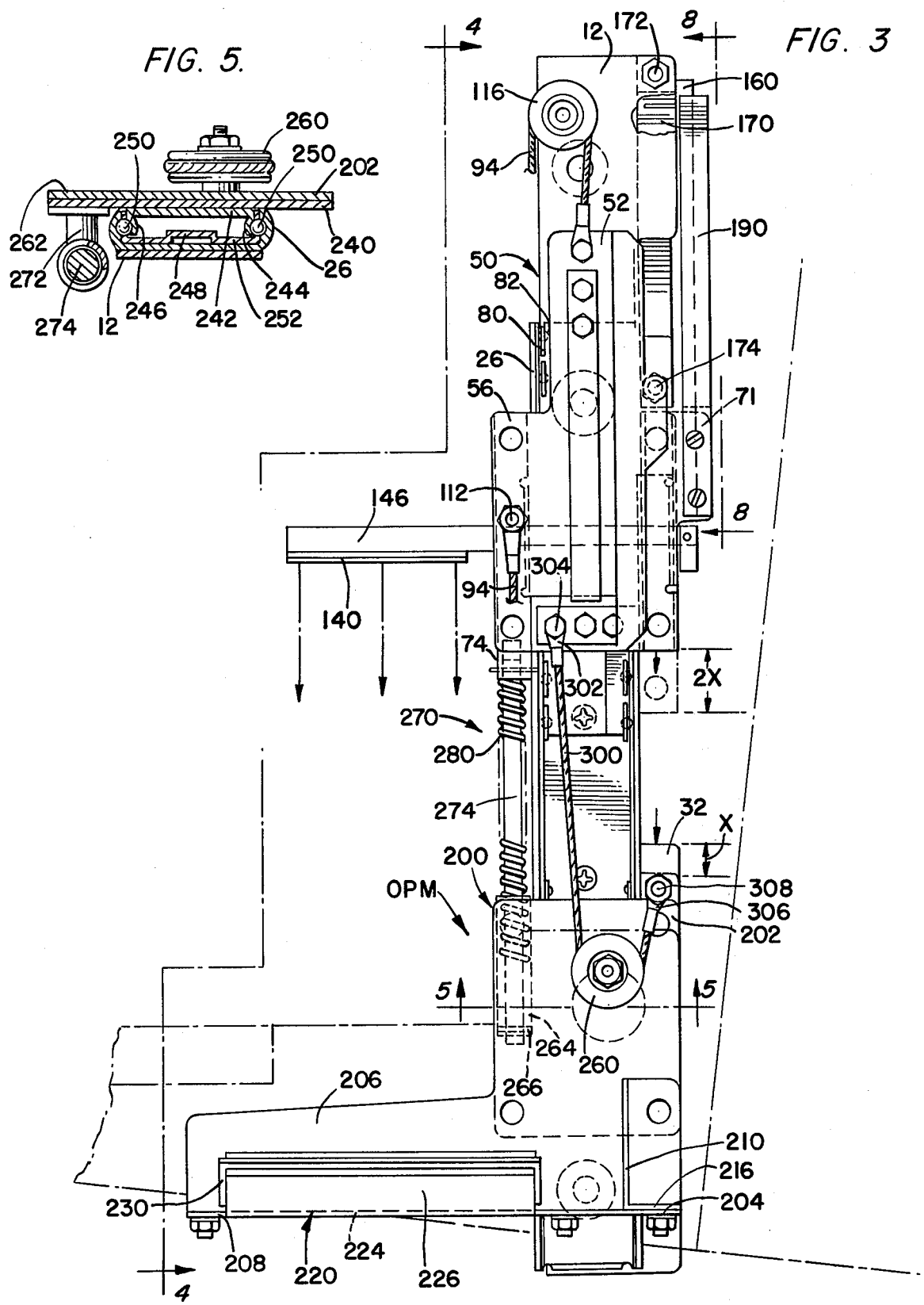

SCAN MECHANISM FOR A MICROFILM READER/PRINTER

BACKGROUND OF THE INVENTION

The present invention relates in general to microfilm reader, and, more particularly, to microfilm reader/printers.

The field of information retrieval has developed rapidly in recent years, and there is much art in this area. However, known devices have several drawbacks. The primary drawback is caused by the failure of known devices to properly optically couple a microfilm reader to a rotating printing process in a manner which is independent of the magnification ratio of the reader.

Secondly, the known devices require complete disappearance of the viewed image to effect printing. A user's concentration is thereby interrupted.

Some prior art devices, such as those devices disclosed in U.S. Pat. Nos. 3,871,766 and 4,023,897, have means for maintaining conjugate length. However, there is no known device having means for holding a slit image path at right angles to an intercepted array of light throughout a complete scan sequence. More broadly, there is only one known device relating to scanning on the image side of a projection lens; however, in this device, disclosed in U.S. Pat. No. 3,841,753, the image is not formed on a rotating drum.

Thus, there is need for a device which not only maintains a conjugate length path constant, but also maintains a slit image path at right angles to an intercepted beam of light.

SUMMARY OF THE INVENTION

The device embodying the teachings of the present invention couples the stationary image of the microfilm reader to a rotating drum of a printer in such a manner as to faithfully transfer the stationary image to the surface of the drum.

The device includes means to maintain a fixed conjugate length of a slit image path to preserve the magnification ratio and focus, and means to maintain the angle of the slit image path normal to the axis of the stationary image path across the entire format.

A scan mirror is attached to the center axis of a rotating shaft. One end of a lever arm is attached at right angles to this shaft. The other end has a pin at right angles which rides on a ramp. The angle of the ramp is adjusted to rotate the scan mirror shaft the required amount as the assembly is scanned across the stationary image cone. The arm pin is held in contact with the ramp by a suitable spring.

As the scan mirror moves across the optical path during a scanning movement, the distance from that mirror to the fixed position rotating drum changes; however, the distance between the mirror and the viewing screen remains constant. Thus, the distance traversed by the image reflected by the scanning mirror must be changed in an amount corresponding to the movement of the scanning mirror so that the total distance traversed by the image reflected by the scanning mirror to the drum remains constant.

The scanning mirror of the present device is physically and optically coupled to a pair of auxiliary mirrors which are also physically and optically coupled with each other. The pair of auxiliary mirrors are physically coupled to the scanning mirror to move half the distance moved by the scanning mirror. As the scanning mirror moves across the scan distance, the motion of the scanning mirror is coupled through a compression spring to the auxiliary mirrors. These mirrors, however, are only allowed to move half the distance by the action of a pulley and wire arrangement.

The apparatus embodying the teachings of the present invention therefore optically couples a microfilm reader to a rotating printing process independent of the magnification ratio of the reader.

During the printing process, the reader screen image does not disappear in total, but is merely interrupted by a narrow shadow of the mirror that moves across the screen. This provides a psychological benefit to the operator by not interrupting his concentration on the screen image.

OBJECTS OF THE INVENTION

It is a main object of the present invention to couple the stationary image of a microfilm reader to the rotating drum of a bond printer in such a manner as to faithfully transfer that stationary image to the surface of the drum.

It is another object of the present invention to hold a slit image path in a microfilm reader/printer with a rotating printing process at right angles to an intercepted beam of light.

It is yet another object of the present invention to maintain the conjugate length in a microfilm reader/printer using a rotating printing process fixed.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is a perspective of a reader/printer embodying the teachings of the present invention.

FIG. 2 is a perspective view of a device used in the FIG. 1 reader/printer embodying the teachings of the present invention.

FIG. 3 is an elevation view of the FIG. 2 device.

FIG. 5 is a view along line 5—5 of FIG. 3.

DETAILED DESCRIPTION OF THE INVENTION

Shown in FIG. 1 is a reader/printer RP which has an automated retrieval system. The device RP has a viewing screen VS and a control panel CP located on the front of the device. The device has a copy tray CT and is mounted on a support stand SS, to be at a convenient height for a user.

Figure 11:
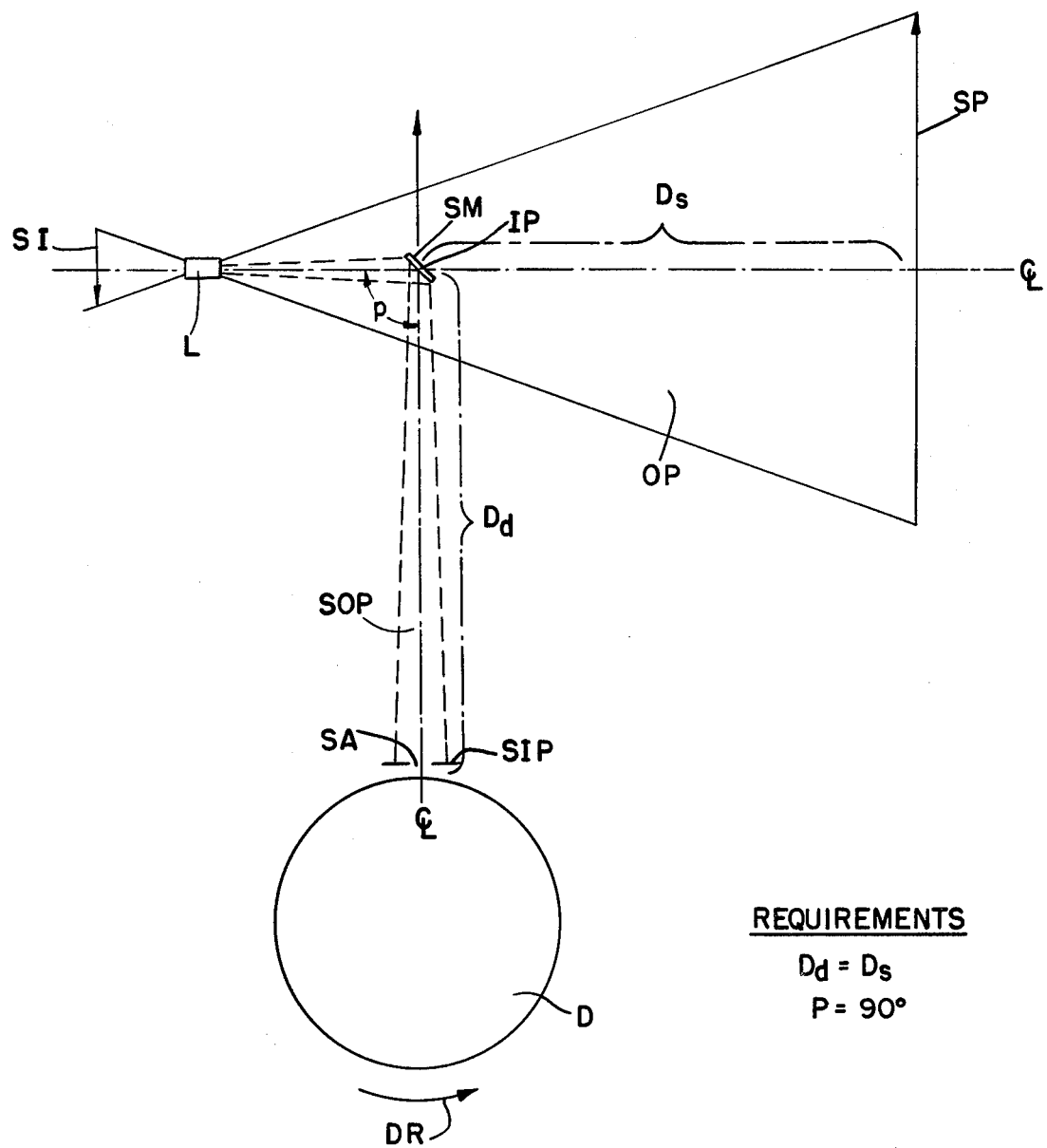
FIG. 11 is a schematic illustrating the basic principles of the mechanism embodying the teachings of the present invention.

The reader/printer RP couples the stationary image of a microfilm reader to the rotating drum of a bond printer and transfers that stationary image to the surface of the drum. FIG. 11 illustrates the basic principles of operation of the device embodying the teachings of the present invention. A stationary image SI is projected onto the screen VS via a projection lens L which defines an optical path OP. An image SP is defined on the screen VS by this projection system. A narrow scan mirror SM is transported at right angles across the optical path OP to produce a slit image having an optical path SOP projected into a slit aperture SA defined by plate SIP. It is noted that both optical paths OP and SOP are conical in shape. The aperture SA couples the mirror projected image to a rotating drum D which is rotated in the direction of arrow DR in FIG. 11. The scan motion of the mirror SM is coupled to the rotating motion of the drum D by any suitable means (not shown). The scan image is synchronized with the rotary motion of the drum.

As indicated in FIG. 11, faithful coupling of the scan image and the rotating drum has two requirements. First, the length of the slit image optical path SOP, represented by the height line $D_d$ must be kept equal to the path length to the viewing screen VS of the stationary image SI from the point of intercept. The point of intercept is indicated in FIG. 11 by the reference indicator IP, and the path length to the viewing screen from the point IP is indicated by the line $D_s$ in FIG. 11.

The second requirement for faithful synchronization of mirror scan motion in drum rotation is maintaining the angle of the slit image optical path normal to the access of the stationary image optical path. The angle between the slit image optical path SOP and the stationary image optical path OP is indicated in FIG. 11 by the reference indicator p, and thus the second requirement is that the angle p be kept equal to 90° during the scanning motion of the scan mirror SM.

Thus, the two requirements for proper synchronization of mirror scan motion and drum rotation are: $D_d = D_s$; and p=90° during the scan operation. To fulfill these two requirements, the device embodying the teachings of the present invention has a scan mirror rotating mechanism MM, and an optical path length setting mechanism OPM. The remainder of this disclosure will be directed to describing these two mechanisms.

The device for coupling the stationary image to the drum is shown in FIG. 2 by the reference indicator 10. The device 10 includes an L-shaped mounting bracket 12 having a backing plate 14 and a flange 16 integrally connected together to define the L-shape of the bracket. A plurality of mounting stud receiving braces 18 are mounted on the plate 14 for mounting the device 10 in the device RP. The mounting stud braces are spaced apart longitudinally of the elongate bracket 12 at locations suitable for secure mounting of the device 10.

A tracking defining member 20 is mounted on top surface 22 of the bracket 12, whereas the braces 18 are mounted on rear surface 24 of that bracket. The trackway defining member 20 is elongate and includes a pair of arcuate guide tracks 26 extending longitudinally of the bracket 12 for a substantial portion of the length thereof. End plates 30 are positioned to extend transversely of the member 20 for a purpose to be discussed below. The trackway defining member 20 may be attached to the bracket 12 by any suitable means, such as fastening screws, or the like. An apron 32 is defined by the backing plate 14 adjacent the trackway member, for a purpose to be discussed below.

Figure 10:
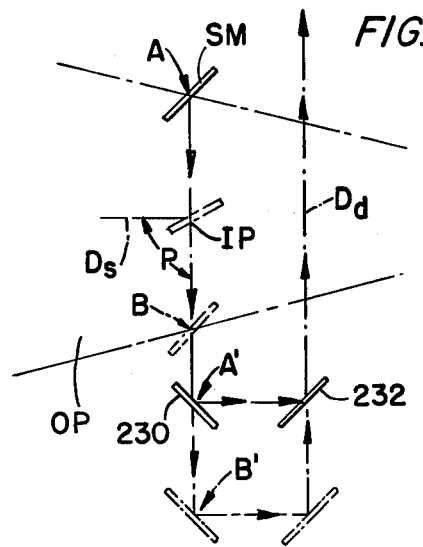
FIG. 10 is a schematic illustrating the angular motion required of the scan mirror to maintain the slit image optical path normal to the optical path of the stationary image in view of the diverging nature of the rays across the stationary image cone.

As above-discussed, the mirror rotating mechanism maintains angle p equal to 90° as the mirror moves across the optical path OP. This movement is illustrated in FIG. 10. As the mirror moves from one point on the optical path to another point on that optical path, the angle of incidence thereon changes. Thus, the mirror must be rotated as indicated in FIG. 10 as the mirror traverses the optical path.

The scan mirror rotating and moving mechanism MM is shown in the figures, and attention is directed thereto. The mechanism MM includes a scanning mirror carriage member 50 movably mounted in the trackway defined by the trackway defining member 20. The carriage 50 includes an L-shaped bracket 52 having a mounting plate 54 which includes an apron 56, and an L-shaped flange 58 having a backing flange 60 attached to the plate 54 to extend away from front surface 62 thereof, and a top flange 66 extending essentially parallel to the plate front surface 62 away from the back flange 60. A backing plate 70 is fixedly mounted on the rear surface of the bracket 52 and extends outwardly of that bracket beneath the top flange 66. The backing plate 70 has an extension 71 (FIG. 3) thereon. A mounting strip 72 is attached to the rear surface of the backing plate 70, and has a lower end 74 extending beyond superposed lower end edges 76 and 78 of the bracket and backing plate.

A roller bearing cage 80 (FIG. 3) is fixedly mounted on the carriage 50, and holds a plurality of roller bearings 82 in the guide tracks 26 thereby mounting the carriage 50 in the trackways of the member 20 for movement therein. The carriage 50 thus moves longitudinally of the trackway defining member, and, hence, longitudinally of the mounting bracket 12. Suitable lubricant can be located in the trackways to assist movement of the roller bearings therein.

A carriage moving mechanism 90 is attached to the mirror carriage 50 for moving that carriage in the trackway. The moving mechanism 90 includes a rotating drum 92 connected to a motor, or other such device to be rotated thereby. A cable 94 is wrapped around the drum 92 and is trained around pulleys 96, 98, 100 and 102 as shown in FIG. 2. The pulleys are mounted to be oriented as shown with the pulley 96 being mounted on a bracket 106 which is yieldably held by a spring 108 to a suitable mounting means.

One end of the cable 94 is attached to the carriage 50 near the lower end thereof by an anchor 112 located on the carriage apron. The other end of the cable is trained around a pulley 116 rotatably mounted on the mounting bracket 12, and is attached to the carriage 50 near the top thereof by an anchor 120.

With the mounting bracket 12 fixed, rotation of the drum 92 causes movement of the carriage 50 in the longitudinal direction of the bracket 12 by appropriate movement of the cable 94. Thus, rotation of the drum 92 causes the carriage 50 to move up and down along bracket 12 as indicated by arrows 126 in FIG. 2.

A switch activating strip 130 is fixedly mounted on the carriage 50 to activate appropriate switches during movement of the carriage 50.

The scan mirror SM is elongate and narrow so that only a small interruption of a viewing screen image occurs during the scanning operation. The mirror has a front reflective surface 140, and is attached at the back surface 142 thereof to a rocking bar 146. The rocking bar has a flat area for attachment to the mirror, and is mounted on the carriage 50 for movement therewith. A mounting flange 148 is mounted on the apron 56 to extend to the rear thereof. The rocking bar 146 extends through a hole defined in flange 148, and a bushing 152 is mounted in the hole about the rocking bar. A second mounting flange 156 is also attached to the rear of the carriage backing plate. The rocking bar end remote from the mirror is received through a hole defined in this second mounting flange, and a bushing surrounds the rocking bar in that hole to permit free movement of the rocking bar therein.

A swing arm 160 is elongate and has one end thereof fixedly attached to the rocking bar end remote from the mirror. A washer can be interposed between the swing arm and the bushing. The swing arm extends upwardly from the rocking bar toward the top of the carriage as viewed in FIG. 2. The fixed connecting between the rocking bar and the swing arm constrains the rocking bar to rocking movement which is initiated and controlled by the swing arm. A follower pin 164 is fixedly attached to the swing arm at the upper end of that arm, that is, the end of the swing arm remote from the rocking bar.

It is here noted that the terms "up" and "lower" are terms of convenience and are taken with reference to the orientation of the mechanism 10 shown in FIG. 2. These terms, however, are not intended to be limiting as the mechanism can assume any suitable orientation.

Figure 8:
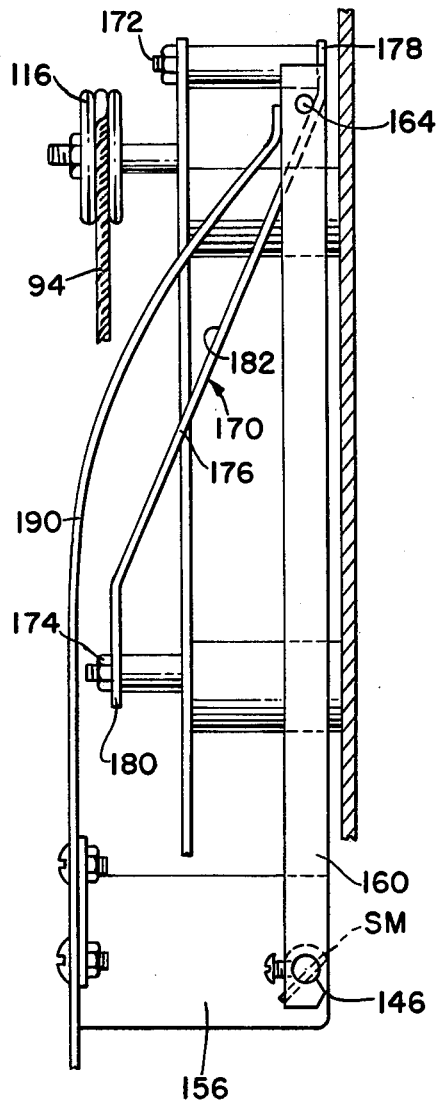
FIGS. 8 and 9 show side elevation views of the mirror moving mechanism in two positions.
Figure 9:
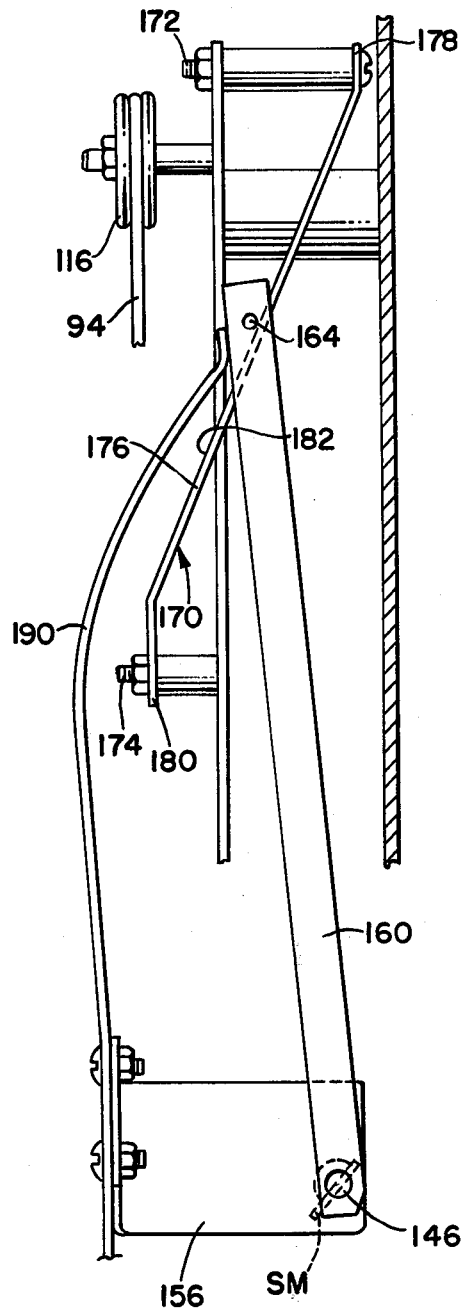

A ramp defining element 170 is elongate and is fixedly mounted on the mounting bracket 12 by anchors 172 and 174. The element 170 has a central section 176 and ends 178 and 180 which are bent in opposite directions and connected to the anchors 172 and 174 respectively so that the central section defines a ramp 182 which is inclined from the rear toward the front surfaces of the bracket 12 as best shown in FIGS. 8 and 9. The ramp is thus forwardly declining from the anchor 172 toward the front of the bracket to the anchor 174. The follower pin 164 slidably rests on the ramp 182, and follows the slanting direction of the ramp. As the other end of the swing arm is fixed, the swing arm pivots about the rocking bar end thereof as the carriage moves up and down the trackway due to the inclined nature of the ramp. A leaf spring 190 is mounted on the carriage 50 at one end thereof and has the other end thereof bearing against the swing arm follower pin end to urge the follower pin toward the ramp 182, thereby maintaining contact between the follower pin and the ramp during movement of the carriage.

As shown in FIGS. 8 and 9, the translatory motion of the carriage 50 is translated into rotary motion of the mirror SM by the swing arm controlled rocking bar which is guided along the ramp 182, and which pivots about the rocking bar end thereof during such carriage translatory movement. The slope and length of the ramp is selected to provide the proper amount of rotation for the scan mirror during travel of the mirror carriage, as indicated in FIG. 10. The mirror thus moves across the optical path as the carriage moves in rectilinear motion, and simultaneously rotates due to the engagement between the follower pin and the ramp during this rectilinear movement to maintain the angle p equal to 90° during this scanning movement, as indicated in FIGS. 8, 9 and 10. One requirement for faithful synchronization of mirror scan motion and drum rotation is thus fulfilled by the mechanism MM.

Figure 4:
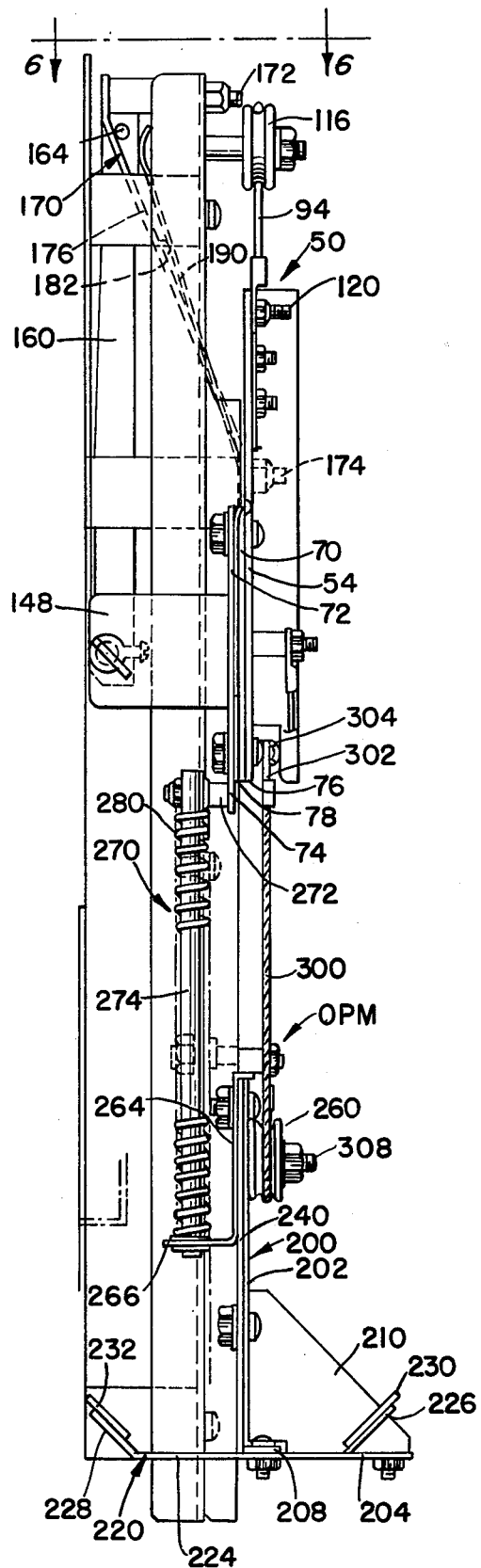
FIG. 4 is a view along line 4—4 of FIG. 3.
Figure 6:
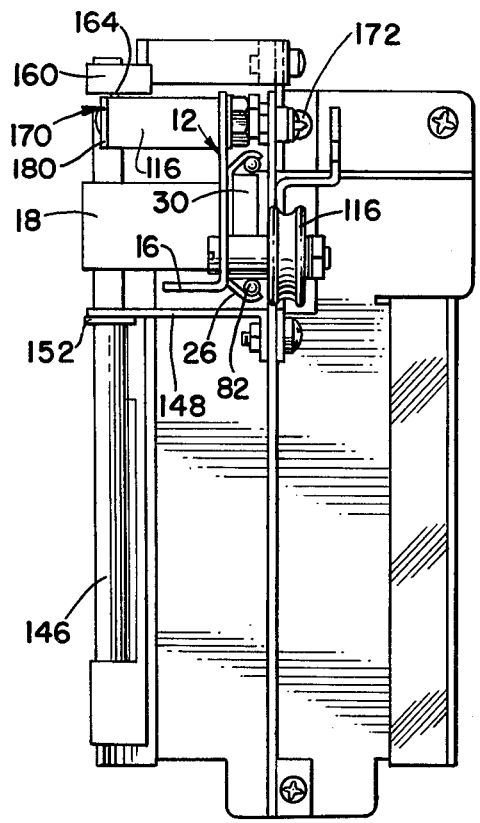
FIG. 6 is a view along line 6—6 of FIG. 4.
Figure 7:
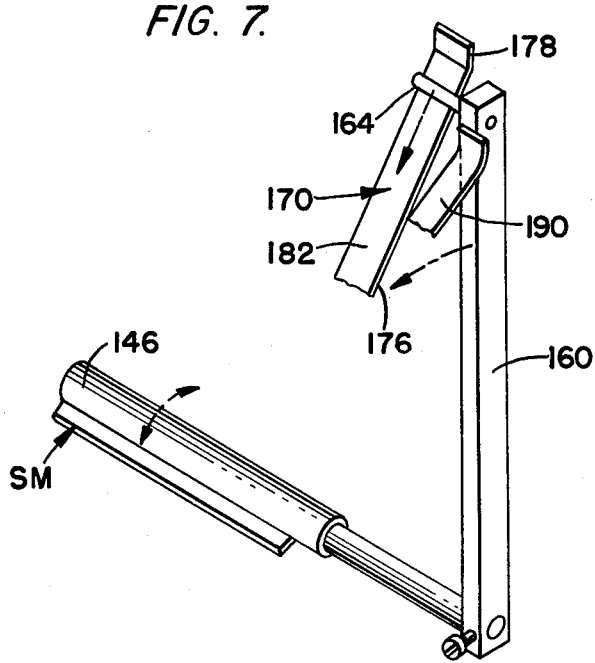
FIG. 7 is a partially cut away perspective of a portion of the scanning mirror moving mechanism of the device embodying the teachings of the present invention.

The optical path length setting mechanism OPM is best shown in FIGS. 2, 3 and 4, and includes a chaser carriage 200. The chaser carriage includes a bracket plate 202 having a mounting flange 204 on one end thereof. A U-shaped support leg 206 extends from one side edge of the plate 202 and has a foot flange 208 coplanar with the mounting flange 204. A support bracket 210 is connected to the bracket plate 202, and has a lower flange 216 coplanar with the foot flange and the mounting flange. A base plate 220 is horizontally disposed and is mounted on the flanges 204, 208 and 216. The base plate 220 has a central web 224 and a pair of wings 226 and 228 bent upwardly from the web at an oblique angle therewith. Both wings form identical angles with the web for a purpose to be discussed below. Mirrors 230 and 232 are each mounted on the wings 226 and 228, respectively, to have reflective surfaces thereof presented toward each other as shown in FIG. 2.

A backing plate 240 is mounted on the rear side of the bracket plate 202 and includes a guide cage 242 thereon. As shown in FIG. 5, the guide cage includes a pair of tracks 244 and 246 extending longitudinally of the backing plate. End plates are located on the ends of the tracks to define a closed cage. Catches, such as catch 248 shown in FIG. 5, are also included in the cage member. The tracks 244 are complementary to the guide tracks 26, and slightly spaced therefrom with both tracks being oppositely arcuate to form a raceway therebetween. A plurality of roller bearings 250 are held in a bearing cage 252 and are interposed between the tracks 26 and 244 as shown in FIG. 5. The chaser carriage is therefore slidably mounted on the bracket 12 in a manner similar to the mirror cage 50.

A sheave 260 is mounted on front surface 262 of the plate 202 for a purpose described below. An L-shaped bracket 264 is mounted on the rear surface of the backing plate, and has a lower flange 266 extending rearwardly of that backing plate. A hole is defined in the flange 266 and preferably has a bushing located therein.

A spring mechanism 270 couples the mirror and chaser carriages and includes a stub shaft 272 pivotally mounted on the mirror carriage and extending rearwardly therefrom. A spring guide rod 274 is mounted on the stub shaft and depends downwardly therefrom closely adjacent the guide tracks 26 and extends through the hole in the lower flange 266. The rod 274 is loosely received in this hole to be slidable therein. A spring 280 surrounds the rod 274, and has one end thereof abutting the stub shaft 272 and the other end thereof abutting the lower flange 266. The spring 280 maintains a yieldable bias on the two carriages urging those carriages apart. Thus, if the carriages are unconstrained, the spring 280 will force them apart.

A coupling cable 300 connects the two carriages together. The cable has one end 302 thereof connected to the mirror carriage adjacent the lower end thereof by an anchor 304, and the other end 306 thereof attached to the flange 32 of the mounting bracket 12 by an anchor 308. The end 306 of the cable is thus immovably fixed to the bracket 12, while end 302 is movable with the mirror carriage.

The cable 300 is trained around sheave 260 thereby coupling the chaser carriage to the mirror carriage via the cable 300. The cable 300 has a length such that the cable resists the separating urging of the spring 280.

As the mirror carriage is moved by the cable 94, the spring 280 transmits this moving force to the chaser carriage, and the cable 300 controls the movement of the chaser carriage. Because the cable 300 is fixed at one end and is trained around a sheave, the relation between the distances moved by the two carriages is one-half. That is, as indicated in FIG. 3, the mirror carriage will always move twice as far as the chaser carriage, with the motive force for the two carriages being provided by the drum 92 and the spring 280 which transmits the mirror carriage movement to the chaser carriage. Movement of the carriages is indicated in FIG. 3 by the phantom and solid lines.

By referring to FIGS. 10 and 11, it can be seen that because the distance between the two mirrors 230 and 232 remains fixed, and because of this one-half relation between the carriage movements, the conjugate path length between the interception point IP on the mirror and the drum aperture SA is always equal to the path length between the interception point IP and the screen image SP, or $D_d = D_s$ for all positions of the mirror SM in the optical path OP. The distance $D_d$ is indicated as the right-hand path in FIG. 10, and because the mirrors 230 and 232 move one-half the distance of the scanning mirror SM, the length $D_d$ remains constant as the scanning mirror moves from position A at the top of the image path to position B at the bottom of the image path (as shown in FIG. 10), while the reflecting auxiliary mirrors 230 and 232 move from the position A' to the position B'. The distance between position A' and position B' is equal to one-half the distance between scanning mirror positions A and B.

Thus, as the drum 92 is rotated, the mirror carriage moves toward or away from the bottom of the bracket 12, and the spring 280 and control cable 300 cause the chaser carriage to move correspondingly away from or toward the bracket bottom, that is, toward or away from the mirror carriage, at a relation of one-half the distance moved by the mirror carriage. As the mirror carriage moves, the mirror SM moves and is rotated by the mirror moving mechanism MM. Thus, the angle $p = 90°$ and $D_d = D_s$ for all positions of the scanning mirror SM as that mirror moves across the optical path OP. The image formed from the mirror is thus synchronized onto the surface of the drum.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A mechanism for coupling a stationary image of a microfilm reader to a rotating drum of a printer comprising:
    a scanning mirror located to intercept an image formed by a projection lens of a microfilm reader and having means for moving said scanning mirror across such image, said scanning mirror reflecting an image onto a rotating drum for printing such image; and
    mirror rotating means connected to said scanning mirror rotating said scanning mirror as said mirror moves across an image formed by a projection lens, said mirror rotating means maintaining said mirror oriented in an intercepted image to that an image reflected by said scanning mirror is always at right angles to the intercepted image.

2. The mechanism defined in claim 1 further including a viewing screen for viewing the image formed by a projection lens and conjugate length maintaining means coupled to said scanning mirror maintaining the distance traveled by an image reflected by said scanning mirror onto a rotating drum equal to the distance from said scanning mirror to said viewing screen as said scanning mirror moves across an image projected by a projection lens.

3. The mechanism defined in claim 1 wherein said mirror rotating means includes a mounting bracket, a mirror carriage slidably mounted on said mounting bracket, mirror carriage moving means for sliding said mirror carriage on said mounting bracket, a ramp defining means on said mounting bracket, a follower pin slidably held on said ramp defining means, a swing arm fixedly mounted on said follower pin, a rocker arm fixedly mounted on said swing arm and pivotally mounted on said mirror carriage to define a pivot for said swing arm, and means yieldably urging said follower pin onto said ramp defining means.

4. The mechanism defined in claim 3 further including a rotating drum and a cable wrapped around said rotating drum and attached to said mirror carriage.

5. The mechanism defined in claim 4 further including a viewing screen for viewing the image formed by a projection lens and conjugate length maintaining means coupled to said scanning mirror maintaining the distance traveled by an image reflected by said scanning mirror onto a rotating drum equal to the distance from said scanning mirror to said viewing screen as said scanning mirror moves across an image projected by a projection lens, wherein said conjugate length maintaining means includes a chaser carriage slidably mounted on said mounting bracket, and carriage coupling means coupling said carriages together.

6. The mechanism defined in claim 5 wherein said carriage coupling means includes a carriage spring for transmitting movement of said mirror carriage to said chaser carriage, a sheave on said chaser carriage, and a cable attached at one end to said mirror carriage and at the other end to said mounting bracket, said cable being trained around said sheave.

7. The mechanism defined in claim 5 wherein said conjugate length maintaining means further includes a pair of auxiliary mirrors mounted on said chaser carriage.

8. A method of coupling a stationary image of a microfilm reader to a rotating drum of a printer which includes steps of:
    moving a scanning mirror across a projected image projected by a projection lens of a microfilm reader to reflect an image onto a rotating drum of a printer; and
    rotating the scanning mirror as such mirror moves across the projected image so that an image reflected by the scanning mirror is always at right angles to the projected image.

9. The method of claim 8 further including a step of maintaining the optical distance between the scanning mirror and a rotating drum equal to the distance between the scanning mirror and a viewing screen as the scanning mirror moves across the projected image.

* * * * *